E. W. STULL.
SYSTEM OF ELECTRICAL DISTRIBUTION.
APPLICATION FILED JULY 18, 1908.
996,894.
Patented July 4, 1911.
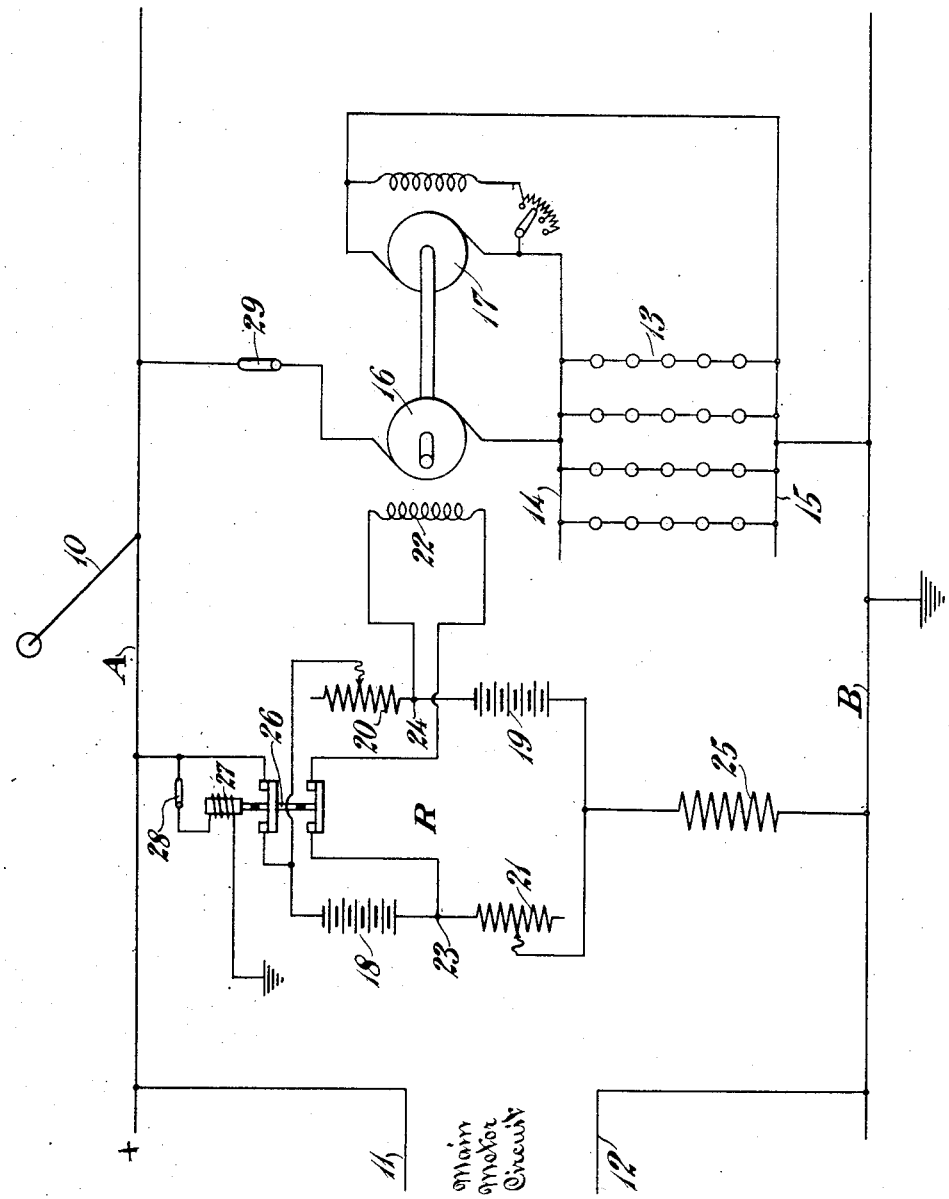

UNITED STATES PATENT OFFICE.

EMMETT W. STULL, OF MILWAUKEE, WISCONSIN, ASSIGNOR TO ALLIS-CHALMERS COMPANY, A CORPORATION OF NEW JERSEY.

SYSTEM OF ELECTRICAL DISTRIBUTION.

996,894. Specification of Letters Patent. Patented July 4, 1911.

Application filed July 18, 1908. Serial No. 444,288.

*To all whom it may concern:*

Be it known that I, EMMETT W. STULL, citizen of the United States, residing at Milwaukee, in the county of Milwaukee and State of Wisconsin, have invented certain new and useful Improvements in Systems of Electrical Distribution, of which the following is a full, clear, and exact specification.

My invention relates to a system of circuits for maintaining constant the voltage of a circuit which is supplied from a circuit of variable voltage.

A great many electrical devices require a constant voltage supply in order to operate satisfactorily. This is especially true of incandescent lamps, the light from which varies much more rapidly than the voltage of the lamp circuit. But often incandescent lamps are supplied from circuits having a variable voltage, such for instance as when they are connected to power circuits in shunt to motors, as on the ordinary electric cars, or are supplied by variable speed generators, as by generators driven by car axles. In order to prevent fluctuations in the light, it is necessary in such cases to provide auxiliary means to maintain constant the voltage supplied to the lamps.

It is the object of my present invention to do this.

My invention may be briefly described as comprising a variable voltage circuit, a second circuit supplied therefrom, a generator armature through which the second circuit is supplied from the variable voltage circuit, and means for so varying and reversing the voltage of the generator that the algebraic sum of the voltages of the variable voltage circuit and of the generator is substantially constant. This variation of the generator voltage is preferably obtained by connecting its field winding in the bridge wire of a sort of Wheatstone bridge arrangement connected across the variable voltage circuit, one pair of opposite arms of the bridge consisting of ohmic resistances while the other pair of opposite arms comprises batteries or other counter electromotive force devices.

The particular novel features of my invention will appear from the description and drawings and will be particularly pointed out in the claims.

The single figure of the drawings shows my invention as applied to the lighting circuit on an ordinary electric railway car.

The main car circuit A—B is connected between the trolley 10 and the ground. The motor circuit 11—12 is connected across the circuit A—B. The arrangement and control of the motors in the motor circuit is immaterial so far as my present invention is concerned. The lamps 13 are connected across a circuit 14—15, which is supplied from the circuit A—B in shunt to the motor circuit 11—12. But since the circuit A—B is essentially a power circuit, and since varying amounts of power will be required elsewhere from the same main supply circuit, the lamps 13 are connected to the circuit A—B through the armature 16 of a generator, the voltage of this generator being so regulated, as hereinafter described, that the voltage of the circuit 14—15 is substantially constant. This generator is driven by a motor 17, preferably shunt-wound, this motor being connected across the constant voltage circuit 14—15 in order to have a substantially constant speed. Also connected across the circuit A—B is a device for regulating the voltage of the generator 16. This device consists of a sort of Wheatstone bridge R, one pair of opposite arms of the bridge containing storage batteries 18 and 19 respectively, or other counter electromotive force devices, and the other pair containing adjustable ohmic resistances 20 and 21 respectively. The field winding 22 of the generator 16 is connected in the bridge wire of this Wheatstone bridge, or between the points 23—24. In order that the batteries 18 and 19 need not be too large, a resistance 25 is preferably connected in the circuit containing the bridge.

The operation of the arrangement is as follows:—When the voltage of the main supply circuit, or of the circuit A—B, which corresponds in voltage to the main supply circuit, is at a predetermined value, this value being determined by the voltage that should be impressed on the circuit 14—15 and on the lamps 13, the drops in voltage in the batteries 18 and 19 are equal respectively to the drops in voltage in the resistances 20 and 21. Consequently the points 23 and 24 are at the same potential, and no current flows in the winding 22. The generator armature 16, though driven as usual at a constant speed by the motor 17, generates no electro-motive force, and the voltage of the circuit 14—15 is the same as that of the main circuit. As the voltage of the main circuit decreases below such predetermined value the current in the bridge R is diminished, and consequently the drops in voltage in the resistances 20 and 21 are also diminished. But because of the electromotive force developed by the batteries 18 and 19, the drops in voltage in such batteries are substantially unreduced, or at most are reduced less than in the resistances. Consequently the potential of the point 24 rises relatively to that of the point 23, the trolley being assumed to be on the positive side of the circuit, and current flows downward through the field winding 22, thus causing the generator armature 16 to generate an electromotive force which is added to the electromotive force of the main circuit and impressed on the circuit 14—15. The greater the fall in the voltage of the main circuit below the aforesaid predetermined value, the greater the current is in the field winding 22, and consequently the voltage supplied by the generator 16 to assist the voltage of the main circuit increases as the latter voltage decreases. Similarly, as the voltage in the main circuit increases above the aforesaid predetermined value, the current through the device R increases and the drops in the resistances 20 and 21 increase. But, as before, the drops in the batteries 18 and 19 remain substantially unchanged. Consequently the potential of the point 23 rises above that of the point 24, and current flows upward through the field winding 22. This causes the generator armature 16 to generate an electromotive force which opposes the electromotive force of the main circuit, and which varies with the increase of said latter electromotive force above the aforesaid predetermined value.

By properly proportioning the various parts, the generator armature 16 may be made to generate an electromotive force of such value that the algebraic sum of the electromotive forces of the main circuit and of the generator armature 16 is a constant, equal to the constant voltage required by the circuit 14—15. By varying the resistances 20 and 21, similarly or dissimilarly, as required, the predetermined voltage referred to above may be made anything desired. This predetermined voltage may be equal to, above, or below the normal voltage of the main supply circuit.

In order to prevent a discharge of the batteries 18 and 19 in case the trolley 10 leaves the trolley wire or a "no voltage" condition arises for any other reason, a double pole switch 26 is provided with one pole in the connection between the main circuit and the regulating device R and the other in the bridge wire of such device. This switch is biased to open position, but is moved to closed position by a solenoid 27 when the main supply circuit is alive and the car circuits are connected thereto. Switches 28 and 29 may be provided, so that the lights 13, the motor generator set 16—17, and the regulating device R may be disconnected from the circuit.

In the arrangement described above the batteries 18 and 19 are arranged merely for regulating purposes. But if the resistance 25 is omitted and the batteries 18 and 19 are made of sufficient capacity, the system is equally applicable to cases where the fluctuations in the supplied voltage vary much more widely, as in the case of axle-driven generators. In such cases, the batteries 18 and 19 can supply current to the lamps 13 for a limited time, even when the main source is entirely out of service.

Many modifications may be made in the precise arrangements herein shown and described, and all such which do not involve a departure from the spirit and scope of my invention I aim to cover in the following claims.

What I claim as new is:

1. In combination, a circuit of variable voltage, a second circuit supplied therefrom, a generator in the connection between the two circuits, and a Wheatstone bridge connected across the circuit of variable voltage and having arms in opposite ones of which the drops in voltage vary proportionately and in adjacent ones of which the drops in voltage vary disproportionately as the voltage of the variable voltage circuit varies, the field winding of said generator being connected in the bridge wire of said Wheatstone bridge.

2. In combination, a circuit of variable voltage, a second circuit supplied therefrom, a generator in the connection between the two circuits, and a Wheatstone bridge connected across the circuit of variable voltage and having arms in any two adjacent ones of which the drops in voltage vary dissimilarly as the voltage of the variable voltage circuit varies, the field winding of said generator being connected in the bridge wire of said Wheatstone bridge.

3. In combination, a circuit of variable voltage, a second circuit supplied therefrom, a generator in the connection between the two circuits, a regulating device connected across the circuit of variable voltage and comprising a Wheatstone bridge having similar counter electromotive force devices in two opposite arms, the field winding of the generator being connected in the bridge wire of said Wheatstone bridge.

4. In combination, a circuit of variable voltage, a second circuit supplied therefrom, a generator armature in the connection between the two circuits, a regulating device connected across the circuit of variable voltage and comprising an electric balance, the voltage drops in any two adjacent arms of which vary disproportionately, and a field winding for said generator armature connected in the bridge wire of said balance.

5. In combination, a circuit of variable voltage, a second circuit supplied therefrom, a generator armature in the connection between the two circuits, a field winding coöperating with said armature, and a regulating device for said field winding, said regulating device comprising a Wheatstone bridge connected across the circuit of variable voltage and having counter electromotive force devices in two of its opposite arms and ohmic resistances in the other two opposite arms, said field winding being connected in the bridge wire of said Wheatstone bridge.

6. A regulator for dynamo-electric machines comprising a Wheatstone bridge, counter electromotive force devices in two opposite arms of said bridge, ohmic resistances in the other two opposite arms thereof, and a controlling magnet winding in the bridge wire thereof.

7. In combination, a circuit of variable voltage, a second circuit supplied therefrom, a generator in the connection between the two circuits, and a Wheatstone bridge connected across the circuit of variable voltage and having arms in any two opposite ones of which the drops in voltage vary proportionately as the voltage of the variable voltage circuit varies, the field winding of said generator being connected in the bridge wire of said Wheatstone bridge.

8. In combination, a circuit of variable voltage, a second circuit supplied therefrom, a generator armature in the connection between the two circuits, a regulating device connected across the circuit of variable voltage and comprising an electric balance, the voltage drops in any two opposite arms of which vary proportionately and in adjacent arms of which vary disproportionately as the voltage of the variable voltage circuit varies, and a field winding for said generator armature connected in the bridge wire of said balance.

9. In combination, a circuit of variable voltage, a second circuit supplied therefrom, a generator in the connection between the two circuits, and a Wheatstone bridge connected across the circuit of variable voltage and having storage batteries connected in one pair of opposite arms and ohmic resistances in the other pair of opposite arms, the field winding of said generator being connected in the bridge wire of said Wheatstone bridge.

10. A regulator for a dynamo-electric machine comprising a Wheatstone bridge, storage batteries connected in two opposite arms of said bridge, ohmic resistances connected in two opposite arms thereof, and a controlling magnet winding in the bridge wire thereof.

In testimony whereof I affix my signature, in the presence of two witnesses.

EMMETT W. STULL.

Witnesses:
H. C. CASE,
FRED J. KINSEY

---

Copies of this patent may be obtained for five cents each, by addressing the "Commissioner of Patents, Washington, D. C."